United States Patent [19]

Aylesworth

[11] 3,757,820
[45] Sept. 11, 1973

[54] HYDRAULIC CONTROL VALVE

[76] Inventor: Albert O. Aylesworth, 3050 Alexander Blvd., Windsor, 10 Ontario, Canada

[22] Filed: Feb. 29, 1972

[21] Appl. No.: 230,355

[52] U.S. Cl. ......... 137/625.3, 137/625.37, 251/205, 251/284
[51] Int. Cl. ........................... F16k 3/24, F16k 3/32
[58] Field of Search .................... 137/625.3, 625.37; 251/205, 284

[56] References Cited
UNITED STATES PATENTS
2,914,359  11/1959  Yarber ........................... 251/205 X
2,583,539  1/1952   Bashark et al. ................ 137/625.37
2,718,240  9/1955   Margrave ..................... 137/625.3 X Primary Examiner—Arnold Rosenthal
Attorney—Peter Kirby et al.

[57] ABSTRACT

A valve mechanism is described for controlling fluid flow, particularly for quickly adjusting the flow between a full flow position and an accurately defined limited flow position. The valve has a cylindrical valve member which is slidably mounted in a central bore and this valve member has a region of reduced diameter with an annular wall extending between the region of reduced diameter and the cylindrical surface of the valve member. One of these annular walls forms a sharp corner with the cylindrical surface and a series of notches are provided in this sharp corner. A pair of flow connected annular recesses are provided in the bore holding the valve member so that at full flow, the region of reduced diameter is over both annular recesses while for restricted flow fluid connection between the annular recesses is via the notches. A third position is also possible where the valve member completely closes the connection between the annular recesses thus preventing any flow.

2 Claims, 8 Drawing Figures

HYDRAULIC CONTROL VALVE

This invention relates to a valve mechanism for controlling fluid flow.

In many types of fluid pressure operated apparatus, it is necessary to provide a control valve for controlling the flow of fluid pressure to the apparatus. Such a valve is frequently arranged either for reversing the flow through the apparatus or for turning the flow either off or on. A typical control system is that described in Canadian Pat. No. 629,737 issued Oct. 24, 1961. It will be seen that the control mechanism has a main housing with inlet and outlet ports leading into a cylindrical bore within which travels a cylindrical valve member having a region of reduced diameter. With this arrangement flow takes place when the region of reduced diameter interconnects the two ports and no flow can take place when the valve member moves out of the connecting position. This is, of course, perfectly satisfactory for a simple off-on operation but the situation becomes much more complex when it is desired to provide a full flow position as well as a position in which only a small amount of flow takes place and finally a closed position. The problem becomes particularly difficult when the amount of flow in the small flow position must be very accurately controlled.

It is the object of the present invention to provide a valve mechanism for controlling fluid flow which can very quickly move from a full flow position to a restricted flow position and, at the same time, very accurately control the amount of restricted flow.

This invention provides a novel arrangement for controlling fluid flow and comprises a valve housing having a cylindrical bore extending through the housing, this bore including a central portion of lesser diameter and concentric end portions of greater diameter. A pair of annular recesses are provided in the central bore, axially spaced from each other with a fluid inlet port connected to one recess and a fluid outlet port connected to the other recess. A cylindrical valve member is slidably mounted in the central bore and this valve member has a bore extending axially therethrough as well as a region of reduced diameter in its external cylindrical face. An annular wall joins the region of reduced diameter with the cylindrical surface of the valve member and forms a sharp corner with the cylindrical surface. A series of notches are provided in this sharp corner. The valve member is arranged to move between three positions, the first being a full flow position in which the region of reduced diameter is over both annular recesses, a second being a restricted flow position in which fluid connection between the annular recesses is via the notches and the third being a no flow position in which the valve member completely closes the connection between the annular recesses.

The mechanism preferably also includes valve actuator members slidably mounted in the end bores. Each valve actuator member is normally spring-biased away from an adjacent end of the cylindrical valve member via a spring member axially recessed into the valve member. The actuator member is slidable between a first position abutting an outer end of the bore and a second position abutting an annular abutment forming an end of the portion of lesser diameter.

The ends of the bore can be conveniently closed by end closure caps and holes can be provided in these caps through which extend slidable pins. These pins then engage with the actuator members for pushing them axially inwardly against the resistance of the springs. These pins can be actuated by a variety of sources, e.g. electric solenoids, air piston, hydraulic pistons, etc.

For a more complete understanding of the invention, there will now be described, by way of example only, and with reference to the accompanying drawings, certain constructural forms of a valve mechanism according to the invention. It is to be understood, however, that the invention is not restricted to the precise constructural details set forth.

Figure 1:
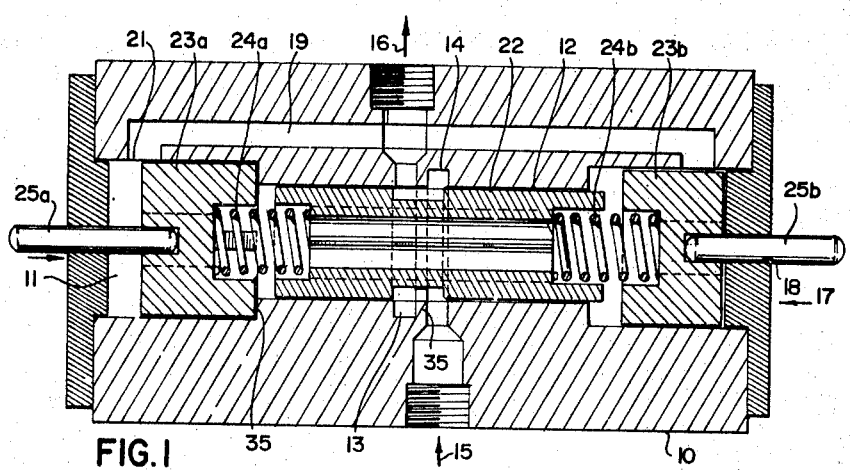
FIGS. 1, 2 and 3 are three similar sectional views showing the valve slide member in its three operative positions.
Figure 2:
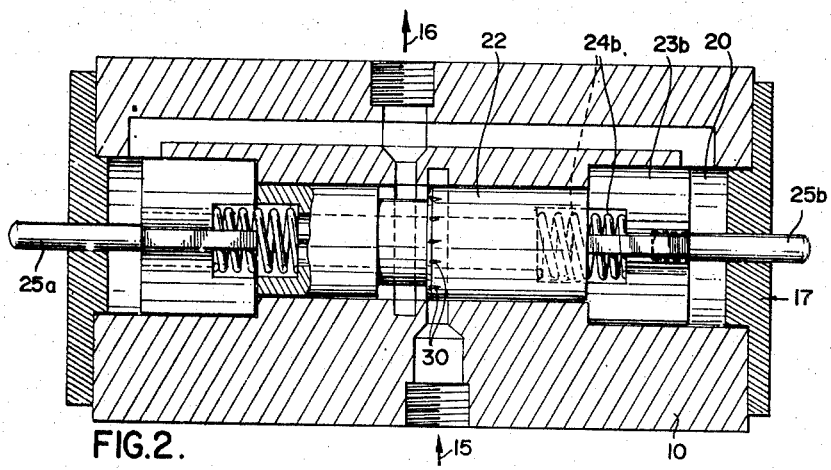
Figure 3:
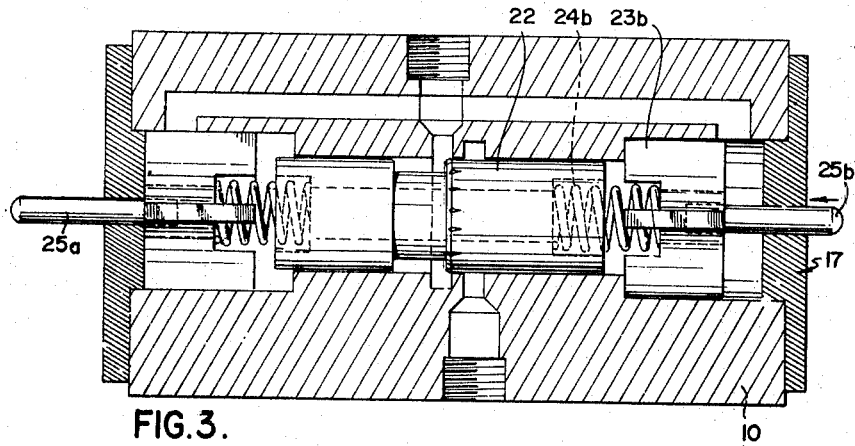

As will be seen from FIGS. 1 to 3, the valve mechanism has a main housing or body 10 through which extends a cylindrical bore. This cylindrical bore has two end portions 11 of larger diameter and a central portion 12 of lesser diameter. At a midregion of the portion of lesser diameter a pair of spaced annular recesses 13 and 14 are provided. It will be seen that these are divided by a narrow annular portion 35. The recess 14 is connected to an inlet port 15 while the recess 13 is connected to an outlet port 16.

The ends of the axial bores 11 are closed by means of end closure caps 17 and these caps have small axial openings 18 therein through which pass actuator pins 25.

Also within the valve housing 10 is provided a passageway 19 which extends from a region adjacent the outer end of one bore of larger diameter 11 to the outer end of the other bore of larger diameter 11. This passageway 19 opens into the cylindrical bore through openings 20 and 21.

Mounted within the cylindrical bore 12 is a cylindrical valve slide mechanism 22. Within the regions of larger diameter 11 are mounted a pair of actuator members 23 which are biased away from the ends of valve member 22 by way of spring members 24. The actuator members 23 also engage the actuator pins 25.

Figure 4:
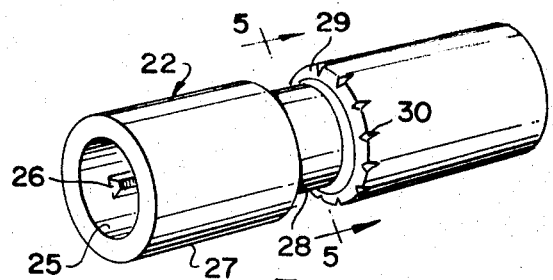
FIG. 4 is an isometric view of the valve slide member.
Figure 5:
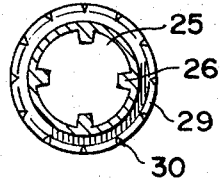
FIG. 5 is a sectional view along line 5—5 of FIG. 4.
Figure 6:
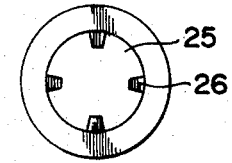
FIG. 6 is an end view of the valve member shown in FIG. 4.

The cylindrical valve member 22 is shown in greater detail in FIGS. 4 to 6 and it will be seen that it is tubular in form with a hollow center 25. Within the inner wall are mounted elongated projections 26 and it will be seen that these are recessed inwardly from the end of member 22. These are provided at both ends so as to provide recesses for receiving the springs as shown in FIGS. 1 to 3.

At a mid-region of the valve member 22 is a region of reduced diameter 28. This region of reduced diameter connects to the outer diameter by way of annular wall portions 29. The junction between the main outer wall portion and the wall 29 forms a quite sharp corner and a series of longitudinal and downwardly inclined notches 30 are provided in this sharp corner.

Figures 7, 8:
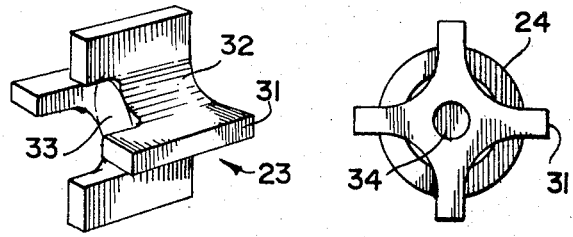
FIG. 7 is an isometric view of a crosshead actuator.
FIG. 8 is an end view of the member shown in FIG. 7.

The crosshead actuator members 23 are shown in greater detail in FIGS. 7 and 8 and it will be seen that when viewed from the end this device has a generally cross-shaped configuration. In other words, there is a central core section 32 from which extends four radial arms 31. A large cylindrical recess 33 is cut into one end of the member 23 and a small bore 34 is provided in the opposite end. The recess 33 receives the spring member 24 while the smaller hole 34 receives pin 25.

DESCRIPTION OF OPERATION

FIG. 1 shows the operation with the left end actuator pin 25a pushing inwardly. It will be seen that pin 25a has pushed actuator member 23a axially as far as it will go in the right-hand direction, i.e. into engagement with abutment 35. At the same time because of the resistance of spring 24a the valve member 22 has slid in a right-hand direction as well as the second actuator member 23b. The result of this movement is that the region of reduced diameter 28 is positioned over both annular recesses 13 and 14 so that a full flow position is provided between inlet port 15 and outlet port 16. In other words, this is the position of maximum flow of fluid through the valve.

When it is desired to move the valve member from a full flow position as shown in FIG. 1 to a restricted flow position as shown in FIG. 2, the right-hand actuator pin 25b is actuated along with the left-hand pin 25a. The result of this is that both of the actuator members 23 are forced inwardly against abutments 35. Since the valve member 22 is precisely the same length as the region of reduced diameter 12, it will be seen that by forcing both of the actuator members 23 up against the abutments 35 and against the resistance of springs 24, the valve member 22 is very precisely located within bore 12. This precise location is such that only the series of notches 30 provide a direct flow between the annular recesses 13 and 14 and thus the inlet and outlet ports 15 and 16. The actual amount of flow allowed to pass through in this position can, of course, be very accurately controlled by the number and size of these notches. For any given number and size of notches the actual flow will always be the same because of the very accurate positioning of the valve member 22.

Finally, when the valve is to be completely closed, the left-hand actuator pin 25a is disengaged allowing the left-hand actuator member 23a is slide back to the position shown in FIG. 3. This means that the valve member 22 also slides in a left-hand direction under the urging of the right-hand spring 24b so as to assume the position shown in FIG. 3. In this position it will be seen that the region of reduced diameter 28 as well as the full extent of the notches 30 has moved in a left-hand direction beyond the edge of annular recess 14 so that there is no longer any direct flow connection between the recesses 13 and 14. Thus, any fluid flow between the recesses is prevented.

As has been mentioned above, it is most important that this valve mechanism be capable of moving between the three operative positions at extremely high speed. There must, therefore, be no significant resistance to the movement of the valve member and it must be able to move to its respective positions without any bounce, etc. To assure this kind of positive response, the valve member 22 has been made with a hollow center so as to allow fluid flow therethrough and the design of the actuator members 23 with its crossarms 31 means that as can be seen from the end view of FIG. 8, there is a direct axial flow connection through both actuator members 23 and the cylindrical valve member 22. This direct flow connection combined with the passageway 19, connected to the cylindrical bores 11 by way of openings 20 and 21 and also being connected to outlet port 16, provide a total release of any backpressure from fluid that may accumulate beyond the outer ends of valve member 22 and the actuator 23.

It will, of course, be appreciated that particularly the crosshead actuator members 23 can assume in infinite variety of shapes provided only that they can meet the functional necessities of the invention including the free passage of any accumulated fluid through opening 20 and into passageway 19.

The embodiments of the invention in which an exclusive property or privilege is claimed are defined as follows:

1. A valve mechanism for controlling fluid flow which comprises:
   a. a valve housing,
   b. a cylindrical bore extending through said housing, said bore including a central portion of lesser diameter and concentric end portions of greater diameter,
   c. a pair of annular recesses axially spaced from each other in the central bore with a fluid inlet port connected to one recess and a fluid outlet port connected to the other recess,
   d. a cylindrical valve member slidably mounted in the central bore, said valve member having a bore extending axially therethrough and a region of reduced diameter in the external face thereof, an annular wall joining the region of reduced diameter with the cylindrical surface of the valve member and forming a sharp corner with said cylindrical surface, and a series of notches in said sharp corner, and
   e. valve actuator members slidably mounted in said end bores, each said valve actuator member being normally spring biased away from an adjacent end of the valve member via a spring member axially recessed into said valve member and said actuator member being slidable between a first position abutting an outer end of said bore and a second position abutting an annular abutment forming an end of said portion of lesser diameter whereby the valve member is movable between three positions, the first being a full flow position in which the region of reduced diameter is over both annular recesses, the second being a restricted flow position in which fluid connection between said annular recesses is via said notches and the third being a no flow position in which the valve member completely closes the connection between the annular recesses.

2. A mechanism according to claim 1 including slidable pins extending through ends of said bore, said pins engaging said actuator members for pushing them axially inwardly.

* * * * *